United States Patent
Camarillo Gonzalez et al.

(10) Patent No.: US 12,348,585 B2
(45) Date of Patent: Jul. 1, 2025

(54) DEVICES AND METHODS FOR PROVISION OF RESOURCE REPRESENTATIONS

(71) Applicant: Telefonaktiebolaget LM Ericsson (publ), Stockholm (SE)

(72) Inventors: Gonzalo Camarillo Gonzalez, Helsinki (FI); Christer Holmberg, Kirkkonummi (FI); Ari Keränen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/913,756

(22) PCT Filed: Mar. 24, 2020

(86) PCT No.: PCT/EP2020/058212
§ 371 (c)(1),
(2) Date: Sep. 22, 2022

(87) PCT Pub. No.: WO2021/190733
PCT Pub. Date: Sep. 30, 2021

(65) Prior Publication Data
US 2023/0336604 A1   Oct. 19, 2023

(51) Int. Cl.
*H04L 65/75* (2022.01)
*G06F 3/01* (2006.01)
(Continued)

(52) U.S. Cl.
CPC ............ *H04L 67/12* (2013.01); *H04L 65/611* (2022.05); *H04L 65/65* (2022.05); *H04L 65/75* (2022.05)

(58) Field of Classification Search
CPC ................. H04L 65/75; H04L 65/65
(Continued)

(56) References Cited

U.S. PATENT DOCUMENTS 7,519,006 B1 *  4/2009  Wing .................. H04L 43/0858
                                                       370/254
10,033,789 B2 *  7/2018  Bhalla .................... H04L 65/611
(Continued)

FOREIGN PATENT DOCUMENTS

CN        109873988 A       6/2019
JP        2013247612 A  * 12/2013
WO    WO-2009087545 A1 *  7/2009   ........... H04N 21/235

OTHER PUBLICATIONS

International Search Report and Written Opinion with Transmittal dated Dec. 9, 2020 in International Application No. PCT/EP2020/058212 (16 pages).
(Continued)

*Primary Examiner* — David R Lazaro
*Assistant Examiner* — Berhanu Shitayewoldetadik
(74) *Attorney, Agent, or Firm* — Rothwell, Figg, Ernst & Manbeck, P.C.

(57) ABSTRACT

A sending node is disclosed that is operable to provide a representation of at least one resource, wherein the resource comprises a sensor measurement, and wherein the representation is operable for transmission using an Internet of Things (IoT) transfer Protocol. The sending node comprises processing circuitry configured to generate (110) a representation of the resource according to a data model, generate (120) a Real-time Transport Protocol (RTP) data packet, wherein the RTP data packet comprises the generated representation of the resource, and send (130) the generated RTP packet to a receiving node. Also disclosed are a receiving node and an intermediate node.

18 Claims, 11 Drawing Sheets

(51) Int. Cl.
   *G06F 11/00* (2006.01)
   *G06F 11/08* (2006.01)
   *G06F 15/16* (2006.01)
   *H04L 15/16* (2006.01)
   *H04L 29/06* (2006.01)
   *H04L 29/08* (2006.01)
   *H04L 65/611* (2022.01)
   *H04L 65/65* (2022.01)
   *H04L 67/12* (2022.01)

(58) Field of Classification Search
   USPC .......................................................... 709/231
   See application file for complete search history.

(56) References Cited

U.S. PATENT DOCUMENTS

| | | | | |
|---|---|---|---|---|
| 11,212,333 | B1* | 12/2021 | Duffy | H04L 65/65 |
| 2003/0016627 | A1* | 1/2003 | MeLampy | H04L 65/1106 |
| | | | | 370/235 |
| 2004/0122637 | A1* | 6/2004 | Askew | B64G 7/00 |
| | | | | 703/2 |
| 2004/0170163 | A1* | 9/2004 | Yik | H04L 65/1101 |
| | | | | 370/389 |
| 2005/0002402 | A1* | 1/2005 | Fairman | H04L 65/65 |
| | | | | 370/395.5 |
| 2007/0081562 | A1* | 4/2007 | Ma | H04N 21/4302 |
| | | | | 375/E7.025 |
| 2007/0159968 | A1* | 7/2007 | Cutaia | H04M 3/42391 |
| | | | | 370/229 |
| 2008/0049626 | A1* | 2/2008 | Bugenhagen | H04L 43/091 |
| | | | | 370/389 |
| 2008/0080390 | A1* | 4/2008 | Ebuchi | H04L 43/12 |
| | | | | 370/253 |
| 2009/0047989 | A1* | 2/2009 | Harmon | G06F 3/0202 |
| | | | | 455/550.1 |
| 2009/0110132 | A1* | 4/2009 | Kondrad | H04L 65/65 |
| | | | | 375/354 |
| 2011/0289538 | A1* | 11/2011 | Begen | H04H 60/33 |
| | | | | 725/107 |
| 2012/0140645 | A1* | 6/2012 | Bonta | H04L 65/80 |
| | | | | 370/312 |
| 2013/0038792 | A1* | 2/2013 | Quigley | A61H 19/32 |
| | | | | 348/E5.009 |
| 2013/0046534 | A1* | 2/2013 | Rabipour | G10L 19/00 |
| | | | | 704/219 |
| 2014/0240688 | A1* | 8/2014 | Fritsch | G01S 7/497 |
| | | | | 356/3 |
| 2015/0244761 | A1* | 8/2015 | Tsyganok | H04L 1/08 |
| | | | | 709/219 |
| 2015/0310490 | A1* | 10/2015 | Meredith | G06Q 30/0261 |
| | | | | 705/14.58 |
| 2016/0219088 | A1* | 7/2016 | Ma | H04L 65/765 |
| 2016/0308934 | A1* | 10/2016 | Gholmieh | H04L 69/28 |
| 2017/0171311 | A1* | 6/2017 | Tennie | H04L 67/01 |
| 2017/0207988 | A1* | 7/2017 | Li | H04M 7/006 |
| 2017/0284839 | A1* | 10/2017 | Ojala | H04L 67/12 |
| 2018/0041934 | A1* | 2/2018 | Agarwal | H04L 41/122 |
| 2018/0123705 | A1* | 5/2018 | Henry | H04L 41/0695 |
| 2018/0255152 | A1* | 9/2018 | Jeuk | H04L 67/63 |
| 2018/0336899 | A1* | 11/2018 | Cook | H04L 65/1083 |
| 2019/0173935 | A1* | 6/2019 | Lohmar | H04L 65/80 |
| 2019/0253475 | A1* | 8/2019 | Bhattacharyya | H04L 65/612 |
| 2019/0274186 | A1* | 9/2019 | Oyman | H04W 28/04 |
| 2019/0289043 | A1* | 9/2019 | Zavesky | H04W 4/21 |
| 2019/0319456 | A1* | 10/2019 | Brathwaite | H02J 4/00 |
| 2019/0319459 | A1* | 10/2019 | Brathwaite | H02J 3/38 |
| 2019/0387039 | A1* | 12/2019 | Han | H04L 65/61 |
| 2020/0021821 | A1* | 1/2020 | Hawari | H04L 65/80 |
| 2020/0076867 | A1* | 3/2020 | Han | H04L 65/752 |
| 2020/0092218 | A1* | 3/2020 | Flomen | H04L 65/80 |
| 2020/0128105 | A1* | 4/2020 | Liu | H04L 65/612 |
| 2020/0186584 | A1* | 6/2020 | Srinivasan | H04L 43/106 |
| 2020/0329088 | A1* | 10/2020 | Oyman | H04L 65/1016 |
| 2020/0336926 | A1* | 10/2020 | Cui | H04L 43/0858 |
| 2020/0374333 | A1* | 11/2020 | Racz | G08B 13/19686 |
| 2021/0211374 | A1* | 7/2021 | Rayner | H04L 65/65 |
| 2021/0219006 | A1* | 7/2021 | Repa | H04N 21/8355 |
| 2021/0250571 | A1* | 8/2021 | Xu | H04N 13/395 |
| 2022/0141708 | A1* | 5/2022 | Arrobo Vidal | H04W 28/06 |
| | | | | 370/329 |

OTHER PUBLICATIONS

Said, O. et al., "IoT-RTP and IoT-RTCP: Adaptive Protocols for Multimedia Transmission over Internet of Things Environments", Jul. 28, 2017, IEEE Access, vol. 5, XP011660482, pp. 16757-16773 (17 pages).

Perkins, C. et al., "RTP Payload for Redundant Audio Data", Network Working Group, Request for Comments (RFC): 2198, Category: Standards Track, Sep. 1997 (11 pages).

Schulzrinne, H. et al., "RTP: A Transport Protocol for Real-Time Applications", Network Working Group, Request for Comments (RFC): 3550, Obsoletes: 1889, Category: Standards Track, Jul. 2003 (104 pages).

Baugher, M. et al., "The Secure Real-time Transport Protocol (SRTP)", Network Working Group, Request for Comments (RFC): 3711, Category: Standards Track, Mar. 2004 (56 pages).

Hellstrom, G. et al., "RTP Payload for Text Conversation", Network Working Group, Request for Comments (RFC): 4103, Category: Standards Track, Jun. 2005 (20 pages).

Rey, J. et al., "RTP Retransmission Payload Format", Network Working Group, Request for Comments (RFC): 4588, Category: Standards Track, Jul. 2006 (35 pages).

Jennings, C. et al., "Sensor Measurement Lists (SenML)", Internet Engineering Task Force (IETF), Request for Comments (RFC): 8428, Category: Standards Track, ISSN: 2070-1721, Aug. 2018 (54 pages).

Shelby, Z. et al., "The Constrained Application Protocol (CoAP)", Internet Engineering Task Force (IETF), Request for Comments (RFC): 7252, Category: Standards Track, ISSN: 2070-1721, Jun. 2014 (112 pages).

International Telecommunication Union, ITU-T, T.140, Telecommunication Standardization Sector of ITU, Series T: Terminals for Telematic Services, "Protocol for multimedia application text conversation", Feb. 1998 (17 pages).

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X| CC=0  |M|   T140 PT   |         sequence number       |
+-+-+-+-+-+-+-+-+-+-+-+-+-+-+-+-+-+-+-+-+-+-+-+-+-+-+-+-+-+-+-+-+
|                       timestamp (1000Hz)                      |
+-+-+-+-+-+-+-+-+-+-+-+-+-+-+-+-+-+-+-+-+-+-+-+-+-+-+-+-+-+-+-+-+
|            synchronization source (SSRC) identifier           |
+-+-+-+-+-+-+-+-+-+-+-+-+-+-+-+-+-+-+-+-+-+-+-+-+-+-+-+-+-+-+-+-+
|                        T.140 encoded data                     |
+                                          +--------------------+
+-+-+-+-+-+-+-+-+-+-+-+-+-+-+-+-+-+-+-+-+-+-+
```

FIG. 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X| CC=0  |M|     PT      |         sequence number       |
+-+-+-+-+-+-+-+-+-+-+-+-+-+-+-+-+-+-+-+-+-+-+-+-+-+-+-+-+-+-+-+-+
|                         1.276020076e+09                       |
+-+-+-+-+-+-+-+-+-+-+-+-+-+-+-+-+-+-+-+-+-+-+-+-+-+-+-+-+-+-+-+-+
|                             4545454                           |
+-+-+-+-+-+-+-+-+-+-+-+-+-+-+-+-+-+-+-+-+-+-+-+-+-+-+-+-+-+-+-+-+
|                     {"u":"Cel","v":23.5}                      |
+                                          +--------------------+
+-+-+-+-+-+-+-+-+-+-+-+-+-+-+-+-+-+-+-+-+-+-+
```

FIG. 11

DEVICES AND METHODS FOR PROVISION OF RESOURCE REPRESENTATIONS

CROSS-REFERENCE TO RELATED APPLICATIONS

This application is a 35 U.S.C. § 371 National Stage of International Patent Application No. PCT/EP2020/058212, filed Mar. 24, 2020.

TECHNICAL FIELD

The present disclosure relates to a sending node, a receiving node, and an intermediate node, methods performed by a sending node, a receiving node, and an intermediate node, corresponding computer programs, corresponding carriers, and corresponding computer program products.

BACKGROUND

The "Internet of Things" (IoT) refers to devices enabled for communication network connectivity, so that these devices may be remotely managed, and data collected or required by the devices may be exchanged between individual devices and between devices and application servers. Such devices, examples of which may include sensors and actuators, are often, although not necessarily, subject to severe limitations on processing power, storage capacity, energy supply, device complexity and/or network connectivity, imposed by their operating environment or situation, and may consequently be referred to as constrained devices.

The constrained nature of IoT devices has prompted the design and implementation of new protocols and mechanisms. The Constrained Application Protocol (CoAP), as defined in RFC 7252, is one example of a protocol designed for IoT applications in constrained nodes and constrained networks. CoAP provides a request-response based RESTful communication architecture between constrained nodes or between constrained nodes and nodes on the Internet. CoAP can easily be integrated to the web and web services by translating CoAP messages to HTTP.

Sensor Measurement Links (SenML), as defined in RFC 8428, is a format for representing simple sensor measurements, and is used by constrained devices for expressing time-stamped data in a fashion that can be efficiently used by highly scalable IoT systems. The SenML formats are designed to be transferred with RESTful protocols, such as HTTP and CoAP. RESTful protocols are typically designed using a request/response model, where a client sends a request to a server, and the server sends back a response to the client. The request and the response can contain a payload, which can consist of SenML-encoded data.

SenML data can be serialized in different formats. Below is an example of SenML serialized using JSON encoding:

```
[
{"n":"urn:dev:ow:10e2073a01080063","u":"Cel","v":23.1,
  "t":1.276020076e+09}
]
```

While the RESTful protocols that are used to transport SenML data scale well for frequent client-server interactions, they produce high overhead levels when dealing with high-frequency data. In addition, deployments that include a highly scalable multimedia infrastructure sometimes do not include an additional suitable transport infrastructure for RESTful protocols carrying high-frequency data.

SUMMARY

It is an aim of the present disclosure to provide a sending node, a receiving node, an intermediate node, methods and a computer readable medium which at least partially address one or more of the challenges discussed above.

According to a first aspect of the present disclosure, there is provided a sending node that is operable to provide a representation of at least one resource. The resource comprises a sensor measurement, and the representation is operable for transmission using an Internet of Things (IoT) transfer Protocol. The sending node comprises processing circuitry configured to generate a representation of the resource according to a data model, generate a Real-time Transport Protocol (RTP) data packet, wherein the RTP data packet comprises the generated representation of the resource, and send the generated RTP packet to a receiving node. An IoT transfer protocol comprises a data transfer protocol that is adapted for use by one or more IoT devices. Examples of IoT transfer protocols include the Constrained Application Protocol (CoAP), Hypertext Transfer Protocol (HTTP), including HTTP/2 and HTTP/3, and Message Queuing Telemetry Transport protocol (MQTT), including MQTT-SN.

According to examples of the present disclosure, the sending node may comprise a computing device, such as an Internet of Things (IoT), or Machine to Machine (M2M) device, and the IoT or M2M device may comprise a constrained device. For the purposes of the present disclosure, a constrained device comprises a device which conforms to the definition set out in section 2.1 of RFC 7228 for "constrained node".

According to the definition in RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content, for example within a room or while goods are transported and stored, motion sensors for controlling light bulbs, sensors measuring light that can be used to control shutters, heart rate monitor and other sensors for personal health (continuous monitoring of blood pressure etc.) actuators and connected electronic door locks. A constrained network correspondingly comprises "a network where some of the characteristics pretty much taken for granted with link layers in common use in the Internet at the time of writing are not attainable", and more generally, may comprise a network comprising one or more constrained devices as defined above.

According to another aspect of the present disclosure, there is provided a receiving node comprising processing circuitry configured to receive an RTP data packet, wherein the RTP data packet has been generated by a sending node and comprises a representation of a resource according to a data model, and extract the representation of the resource from the RTP packet. The resource comprises a sensor measurement, and the representation is operable for transmission using an Internet of Things (IoT) transfer Protocol.

According to another aspect of the present disclosure, there is provided an intermediate node comprising processing circuitry configured to receive an RTP data packet, wherein the RTP data packet has been generated by a sending node and comprises a representation of a resource according to a data model. The processing circuitry is further configured to forward the received RTP data packet to a destination receiving node for the RTP packet. The resource comprises a sensor measurement, and the representation is operable for transmission using an Internet of Things (IoT) transfer Protocol.

According to another aspect of the present disclosure, there is provided a method performed by a sending node that is operable to provide a representation of at least one resource, wherein the resource comprises a sensor measurement, and wherein the representation is operable for transmission using an Internet of Things (IoT) transfer Protocol. The method comprises generating a representation of the resource according to a data model, generating an RTP data packet, wherein the RTP data packet comprises the generated representation of the resource, and sending the generated RTP packet to a receiving node.

According to another aspect of the present disclosure, there is provided a method performed by a receiving node. The method comprises receiving an RTP data packet, wherein the RTP data packet has been generated by a sending node and comprises a representation of a resource according to a data model, and extracting the representation of the resource from the RTP packet, wherein the resource comprises a sensor measurement, and wherein the representation is operable for transmission using an Internet of Things (IoT) transfer Protocol.

According to another aspect of the present disclosure, there is provided a method performed by an intermediate node. The method comprises receiving an RTP data packet, wherein the RTP data packet has been generated by a sending node and comprises a representation of a resource according to a data model, and forwarding the received RTP data packet to a destination receiving node for the RTP packet. The resource comprises a sensor measurement, and wherein the representation is operable for transmission using an Internet of Things (IoT) transfer Protocol.

According to another aspect of the present disclosure, there is provided a computer program comprising instructions which, when executed on at least one processor, cause the at least one processor to carry out a method according to any one of the aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

BRIEF DESCRIPTION OF THE DRAWINGS

For a better understanding of the present disclosure, and to show more clearly how it may be carried into effect, reference will now be made, by way of example, to the following drawings, in which:

FIG. 10 illustrates an example packet structure.

FIG. 11 illustrates an example packet structure.

DETAILED DESCRIPTION

Figure 1:
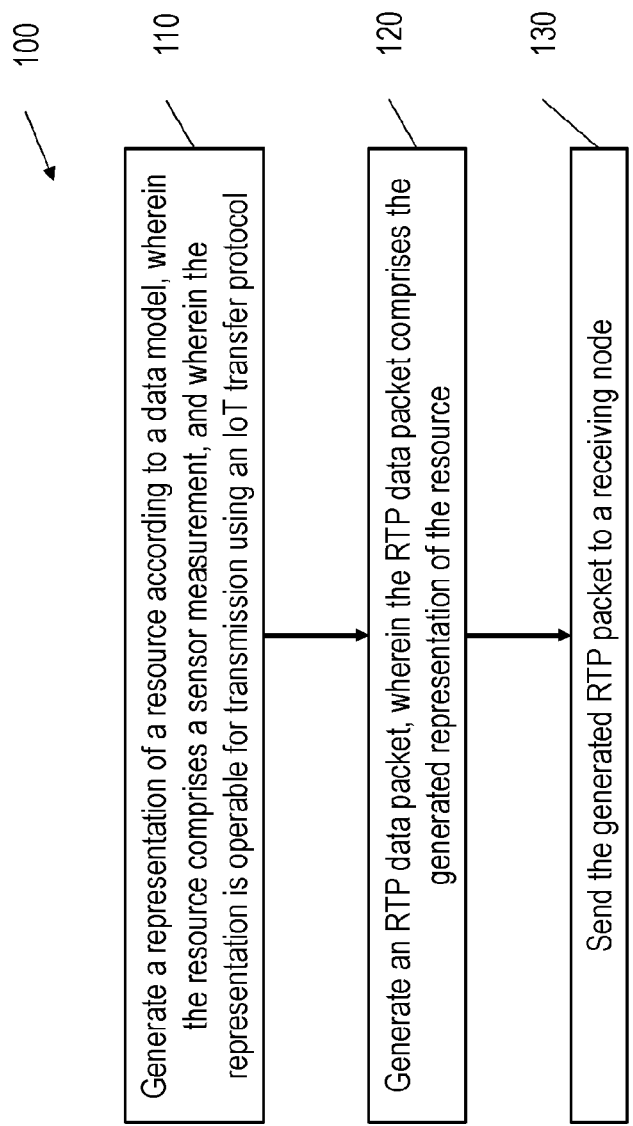
FIG. 1 is a flow chart illustrating process steps in a method performed by a sending node.

Aspects of the present disclose thus provide a sending node and receiving node that are operable to transfer a representation of a sensor measurement, which might otherwise be transferred using an IoT transfer protocol such as CoAP, MQTT or HTTP/2 or HTTP/3, using the Real-time Transport Protocol (RTP). The sensor measurement may be represented using Sensor Measurement Links (SenML), and at least a part of the representation of the sensor measurement may be added to the RTP packet payload. Information from at least one field in the representation may also or alternatively be mapped to a header field of the RTP data packet. A payload type of the RTP packet comprising sensor measurement information may be an existing payload type, or a dedicated payload type for sensor measurement information. Aspects of the present invention also provide an intermediate node, which may receive and forward RTP packets containing sensor measurements. The intermediate node may multiplex streams of such RTP packets.

In order to provide additional context to the apparatus and methods disclosed herein, there now follows a brief outline of the Real-time Transport Protocol (RTP).

RTP, as disclosed in RFC 3550, is a widely deployed user-plane protocol that was designed for transporting audio and video (i.e., multimedia traffic). In addition, RTP is used for transporting different text-based protocols, including real-time text (RFC 4103).

RTP data is transported in containers referred to as RTP payloads. An RTP payload format is defined for each data type to be transported, for example there exist specific payload formats for audio, video, real-time text, etc. The endpoints in an RTP session negotiate which RTP payload formats to use in the session. Each RTP payload is assigned a unique identifier, in order to allow endpoints to properly process received RTP packets.

RTP provides a number of useful features for transporting multimedia traffic. The Synchronization Source Indicator (SSRC) header field allows multiplexing of RTP data from multiple sources on a single RTP stream, allowing receivers to associate each RTP packet with a specific source. The Sequence Number header field is used to detect out-of-order delivery of RTP packets. The Timestamp header field indicates a time value when the media content carried in an RTP packet was sampled, and so facilitates play back of received media content at the correct pace.

The RTP Control Protocol (RTCP) is sometimes used in conjunction with RTP. RTCP is used to provide feedback associated with RTP streams, including packet loss, packet delay, round-trip time, etc. RTCP also allows multiple RTP streams to be synchronized, and can be used to synchronize the playout of audio and video content, for example to ensure lip sync.

The 3GPP IP Multimedia Subsystem (IMS) uses RTP for transporting audio, video, and real-time text. In addition, IMS contains functions for providing media functionality such as conferencing and transcoding. The Session Initiation Protocol (SIP) is used by IMS endpoints to negotiate the establishment of RTP sessions.

Aspects of the present disclosure enable the transport of simple sensor measurements over RTP, thus effectively allowing for streaming of such sensor measurements, and avoiding the high overhead levels associated with transporting high-frequency data over RESTful protocols such as CoAP, HTTP etc.

FIG. 1 is a flow chart illustrating process steps in a method 100 performed by a sending node that is operable to provide a representation of at least one resource, wherein the resource comprises a sensor measurement, and wherein the representation is operable for transmission using an Internet of Things (IoT) transfer protocol. The sending node may for example comprise a computing device, which may be a constrained device, as discussed above. Referring to FIG. 1, the method 100 comprises, in a first step 110, generating a representation of the resource according to a data model. The method further comprises generating an RTP data packet, wherein the RTP data packet comprises the generated representation of the resource, in step 120, and sending the generated RTP packet to a receiving node in step 130.

As discussed above, an IoT transfer protocol comprises a data transfer protocol that is adapted for use by one or more IoT devices. Examples of IoT transfer protocols include the Constrained Application Protocol (CoAP), Hypertext Transfer Protocol (HTTP), including HTTP/2 and HTTP/3, and Message Queuing Telemetry Transport protocol (MQTT), including MQTT-SN.

Figure 2:
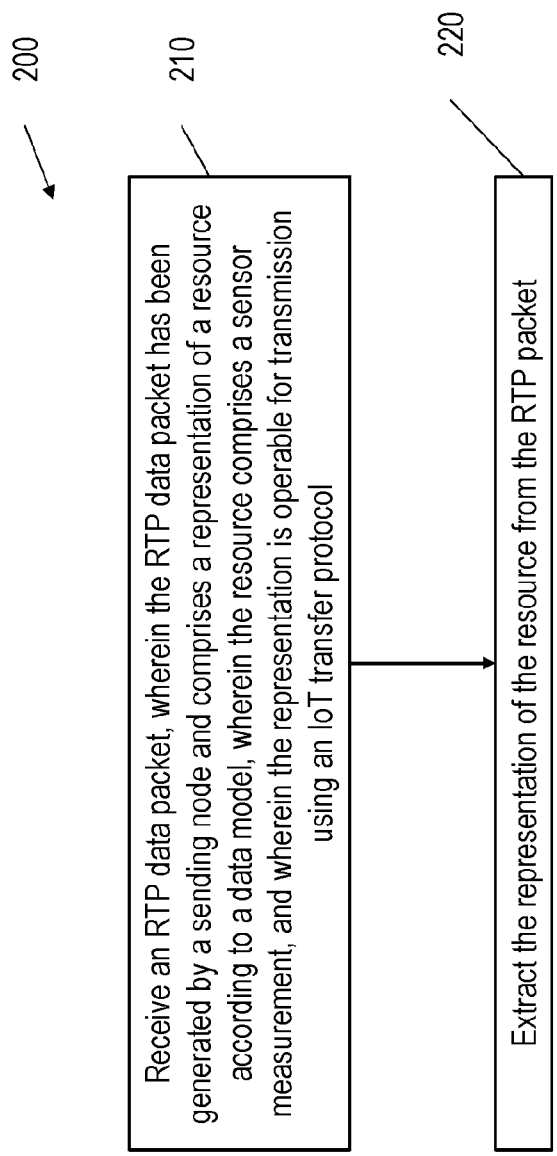
FIG. 2 is a flow chart illustrating process steps in a method performed by a receiving node.

The method 100 may be complimented by a method 200 performed by a receiving node. FIG. 2 is a flow chart illustrating process steps in a method 200 performed by a receiving node, which may be a physical node or a virtual node running in a cloud, edge cloud or fog deployment. Referring to FIG. 2, the method 200 comprises, in a first step 210, receiving an RTP data packet, wherein the RTP data packet has been generated by a sending node and comprises a representation of a resource according to a data model. The method 200 further comprises extracting the representation of the resource from the RTP packet.

The methods 100 and 200 may thus cooperate to allow a sending node to, in effect, stream sensor measurement data using the RTP protocol. The sensor measurement data is suitable for transmission using an IoT transfer protocol such as CoAP, MQTT or HTTP, but according to examples of the present disclosure, such data may be transmitted in RTP packets, thus reducing the high overheads associated with transmitting high frequency sensor measurement data using RESTful protocols such as CoAP, HTTP etc.

Figure 3A:
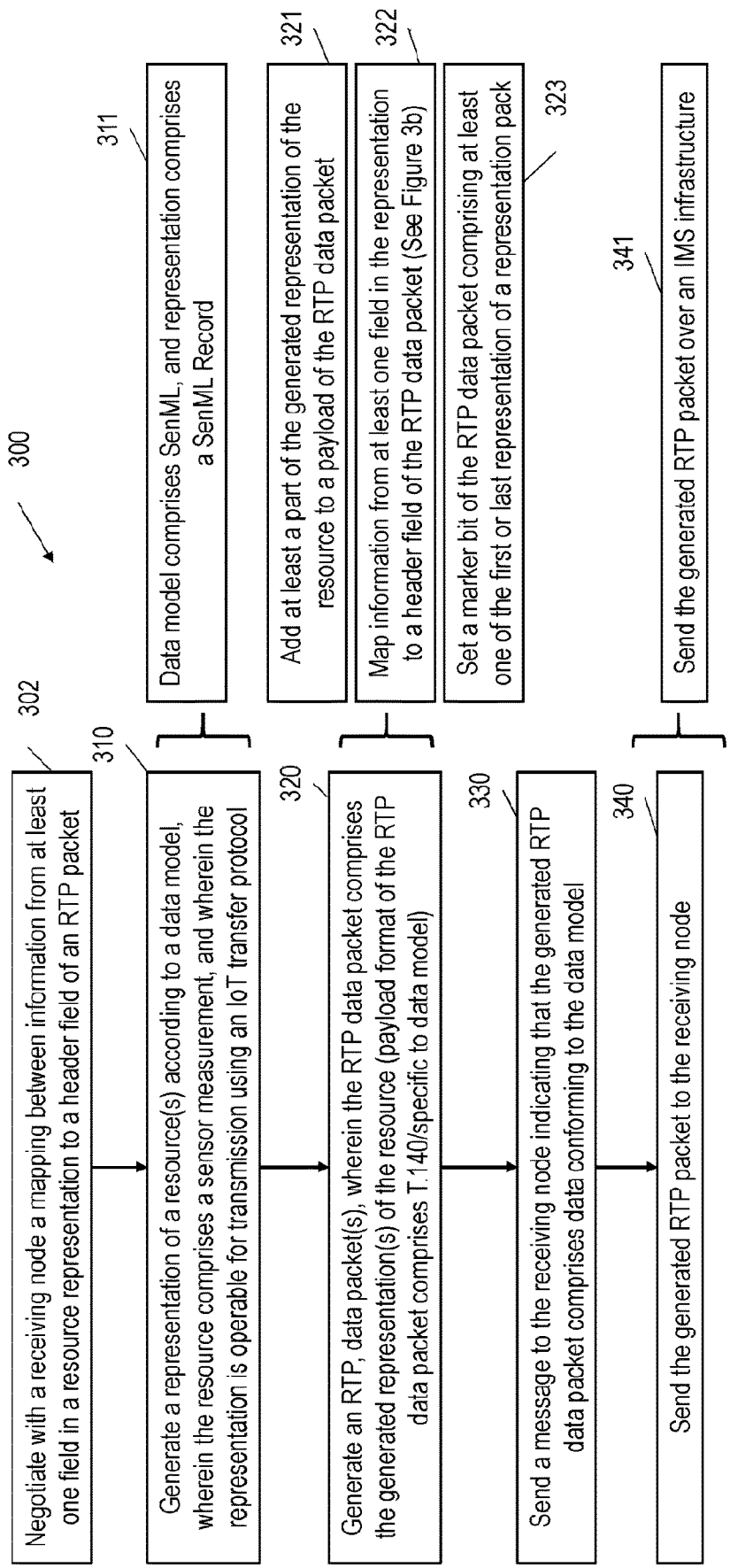
FIGS. 3a and 3b show a flow chart illustrating process steps in another example of the method performed by a sending node.
Figure 3B:
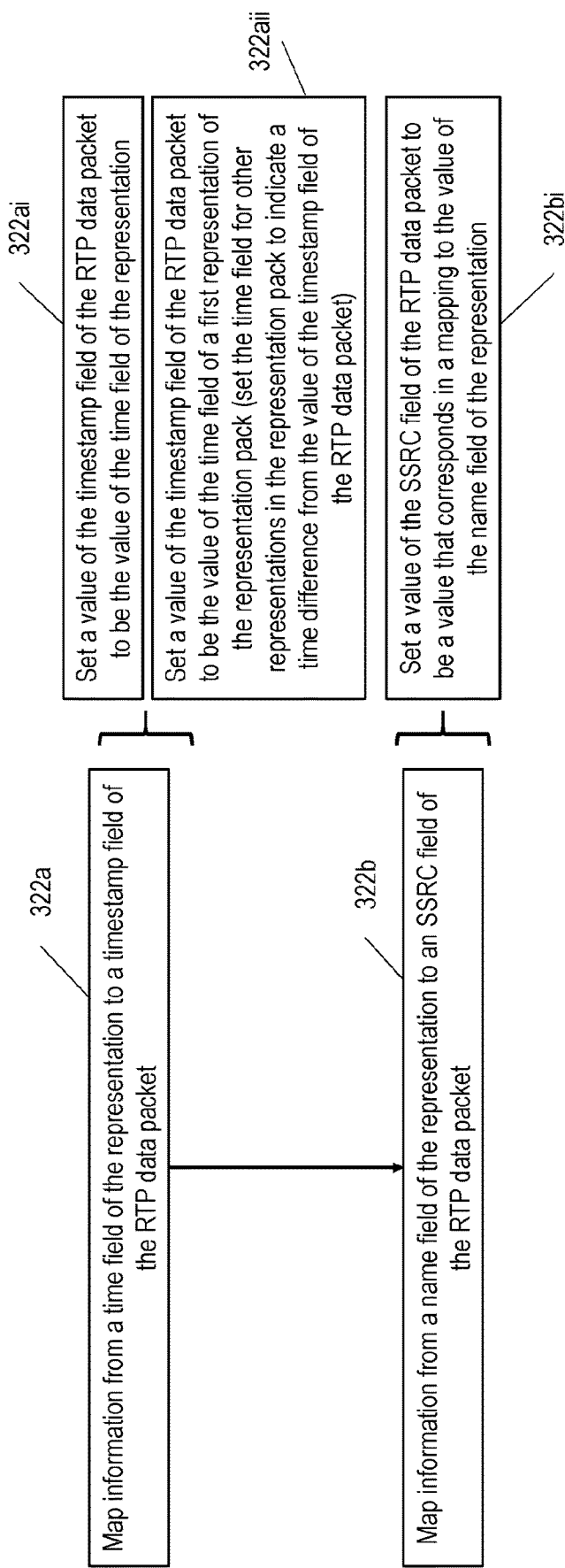

FIGS. 3a and 3b show a flow chart illustrating process steps in a further example of method 300 performed by a sending node that is operable to provide a representation of at least one resource, wherein the resource comprises a sensor measurement, and wherein the representation is operable for transmission using an IoT transfer protocol such as CoAP, MQTT or HTTP. The sending node may for example be a computing device, which may be a constrained device. The steps of the method 300 illustrate one example way in which the steps of the method 100 may be implemented and supplemented in order to achieve the above discussed and additional functionality.

Referring first to FIG. 3a, according to the method 300, in a first step 302, the sending node negotiates, with a receiving node to which the sending node will be sending resource representations, a mapping between information from at least one field in the representation of a resource that the sending node is operable to generate to a header field of an RTP packet. The receiving node may be a physical or virtual node, and may for example be a server or other logical entity that has requested information about the resource, or to which the sending node is configured to provide information about its resources.

The negotiation of step 302 may comprise setting the mapping and delivering it to the receiving node, or receiving the mapping from the receiving node. The mapping may be delivered to or from the receiving node out of band, for example via RTCP or another signalling protocol. Detail of the mapping is discussed below.

In step 310, the sending node generates a representation of the resource according to a data model, wherein the resource comprises a sensor measurement, and wherein the representation is operable for transmission using an IoT transfer protocol. In some examples of the method 300, the sending node may generate a plurality of representations of the resource according to the data model, the plurality of representations comprising a representation pack. The plurality of representations may include representations of the same resource at different times, or of different resources.

As illustrated at 311, the data model may comprise Sensor Measurement Links (SenML) and the representation of the resource according to the data model may comprise a SenML Record. Other data models may also be envisaged, including a wide range of proprietary data formats that may be used to represent sensor measurements. Such formats are generally encoded using XML, JSON, or a binary format.

In step 320, the sending node generates an RTP data packet, wherein the RTP data packet comprises the generated representation of the resource. The sending node may in some examples generate a plurality of RTP data packets, wherein each RTP data packet comprises a generated representation. Each RTP packet may comprise one or more representations. As illustrated at 320, a payload format of the RTP data packet may comprise the T.140 format for real time text, or may comprise a payload format specific to the data model. Thus, for examples in which the data format is SenML, the payload format may be specific to SenML, and may for example be named with reference to the SenML data format, such that the payload format name includes or comprises the name of the data model SenML. In examples in which the payload format comprises T.140, generating an RTP data packet that comprises the generated representation of the resource in step 320 may comprise encoding at least part of the generated representation as a plurality of T.140 code elements.

As illustrated at 321, generating the RTP data packet, wherein the RTP data packet comprises the generated representation of the resource, may comprise adding at least a part of the generated representation of the resource to a payload of the RTP data packet. In some examples, parts of the representation that are mapped to header fields of the RTP packet (as discussed in further detail below) may be excluded from the part of the representation that is added to the payload. Mapped parts of the representation may include the name field, base name field, time field etc.

As illustrated at 322, generating the RTP data packet, wherein the RTP data packet comprises the generated representation of the resource, may also or alternatively comprise mapping information from at least one field in the representation to a header field of the RTP data packet. This mapping step is discussed in further detail below with reference to FIG. 3*b*.

As illustrated at 323, and in examples in which the sending node generates a plurality of representations comprising a representation pack, and a plurality of RTP packets, generating the RTP packets may comprise setting a marker bit of the RTP data packet comprising at least one of the first or last representation of the representation pack.

In step 330, the sending node may send a message to the receiving node indicating that the generated RTP data packet comprises data conforming to the data model. This may be appropriate for examples in which the payload format of the generated RTP packet is T.140. The message may inform the receiving node that the RTP packet comprises, for example, SenML data instead of the real time text data that the receiving node might otherwise expect, given the payload format of the RTP packet. The message indicating that the generated RTP data packet comprises data conforming to the data model may be sent out of band, for example via RTCP or another signalling protocol.

In step 340, the sending node sends the generated RTP packet to the receiving node. As illustrated at 341, the generated RTP packet may be sent by the sending node to the receiving node over an Internet Protocol Multimedia Subsystem (IMS) infrastructure.

FIG. 3*b* illustrates in greater detail how the mapping in step 322 between fields of the generated resource representation and header fields of the RTP packet may be carried out. Referring to FIG. 3*b*, in one example, information from a time field of the representation may be mapped to a timestamp field of the RTP data packet in step 322*a*, and/or information from a name field of the representation may be mapped to a Synchronisation Source (SSRC) field of the RTP data packet in step 322*b*.

Considering first the time field of the representation, in step 322*ai*, the sending node may set a value of the timestamp field of the RTP data packet to be the value of the time field of the representation. The value of the time field may thus be omitted when adding at least a part of the generated representation of the resource to a payload of the RTP data packet. In examples in which the sending node generates a plurality of representations of the resource according to the data model, the representations comprising a representation pack, the sending node may set a value of the timestamp field of the RTP data packet to be the value of the time field of a first representation of the representation pack, as illustrated at 322*aii*. The time field for other representations in the representation pack may be set to indicate a time difference from the value of the timestamp field of the RTP data packet.

Considering now the name field of the representation, the sending node may set a value of the SSRC field of the RTP data packet to be a value that corresponds in a mapping to the value of the name or base name field of the representation. The mapping may be the mapping that was negotiated in step 302. The value to which the entry in the name field of the representation is mapped may be a numeric or alphanumeric value, and may for example be shorter than the entry in the name field. An example mapping is discussed in greater detail below with reference to example implementations of the methods disclosed herein.

Figure 4A:
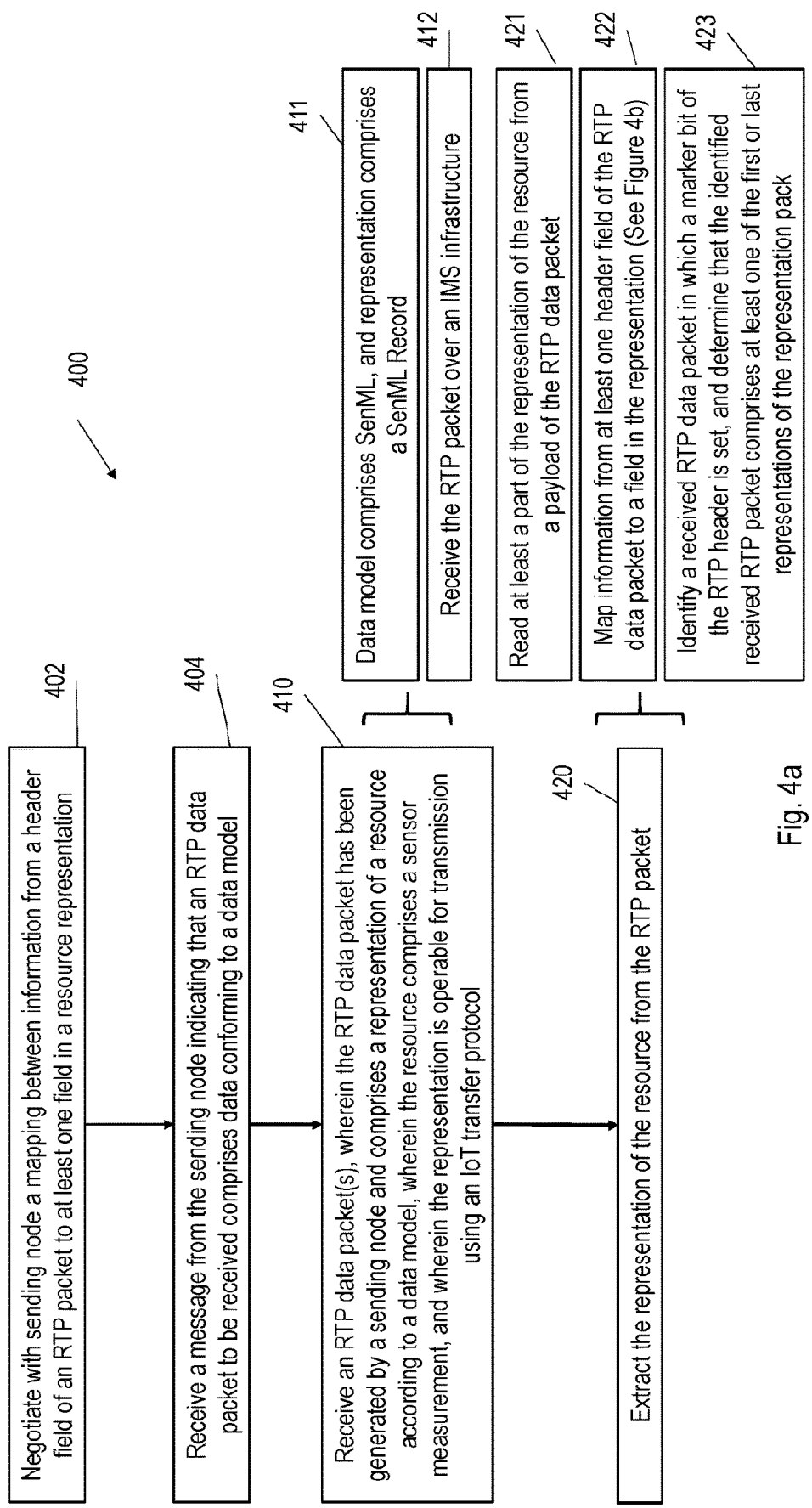
FIGS. 4a and 4b show a flow chart illustrating process steps in another example of the method performed by a receiving node.
Figure 4B:
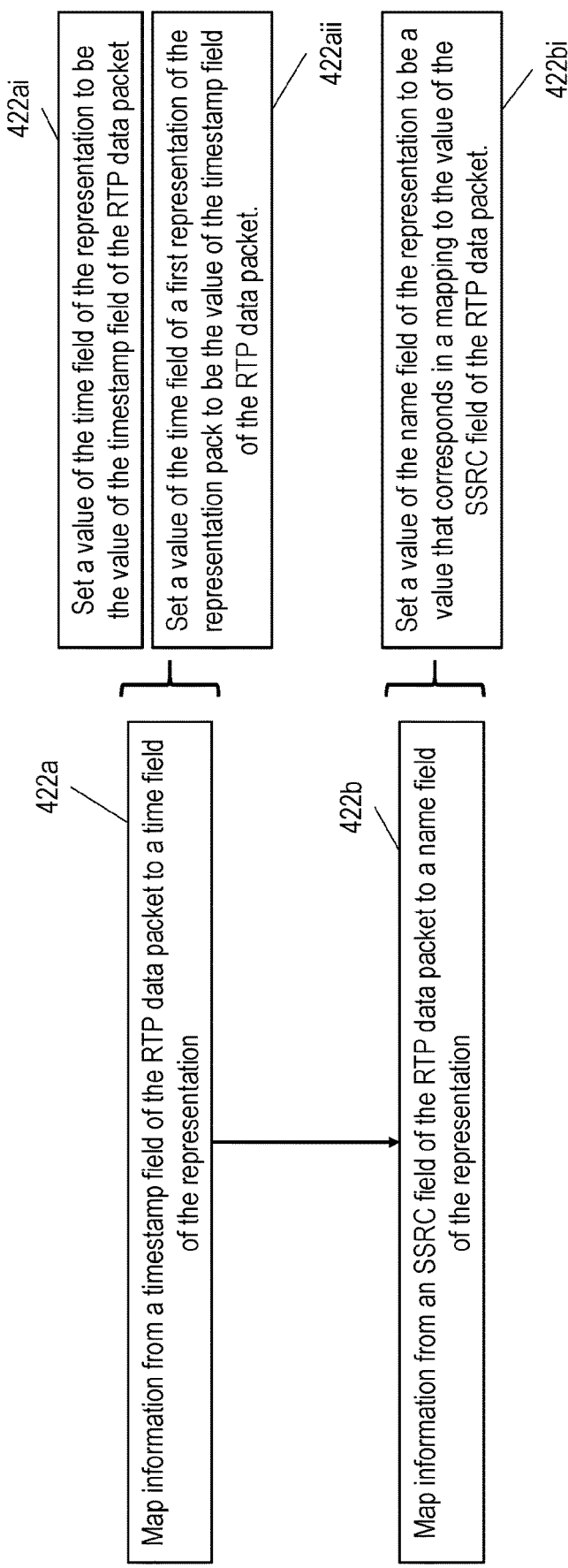

As discussed above with reference to FIG. 2, methods carried out at a sending node as discussed herein may be complemented by a method 200 performed by a receiving node. FIGS. 4*a* and 4*b* show a flow chart illustrating process steps in a further example of method 400 performed by a receiving node, which may be a physical node or a virtual node running in a cloud, edge cloud or fog deployment. The receiving node may for example be a server or other logical entity that has requested information about a resource hosted by a sending node, or to which the sending node is configured to provide information about its resources. The steps of the method 400 illustrate one example way in which the steps of the method 200 discussed above may be implemented and supplemented in order to achieve the above discussed and additional functionality.

Referring first to FIG. 4*a*, according to the method 400, in a first step 402, the receiving node negotiates, with a sending node, a mapping between information from a header field of an RTP packet to at least one field in a representation of a resource that is hosted by the sending node. The sending node may for example be a computing device, which may be a constrained device.

The negotiation of step 402 may comprise setting the mapping and delivering it to the sending node or receiving the mapping from the sending node. The mapping may be delivered to or from the sending node out of band, for example via RTCP or another signalling protocol. Detail of the mapping is discussed below.

In step 404, the receiving node receives a message from the sending node indicating that an RTP data packet that will be received by the receiving node from the sending node comprises data conforming to a data model. This information may override the information contained in the payload format of the RTP packet to be received, for example if the payload format of the RTP packet is T.140, the message received at step 404 would override this information, informing the receiving node that the contents of the RTP packet are not real time text but instead comprise data conforming to a data model. The message received at step 404 may be received out of band, for example via RTCP or another signalling protocol. If the payload format of the RTP packet to be received is specific to the data model, then the message received at step 404 may be omitted, as the relevant information is conveyed by the name of the payload format.

In step 410, the receiving node receives an RTP, data packet, wherein the RTP data packet has been generated by the sending node and comprises a representation of a resource hosted by the sending node, the representation conforming to a data model. The resource comprises a sensor measurement, and the representation is operable for transmission using an IoT transfer protocol such as CoAP, MQTT or HTTP. As illustrated at 411, the data model may comprise Sensor Measurement Links (SenML), and the representation of the resource according to the data model may comprise a SenML Record. The representation may be one of a plurality of representations of the resource according to the data model, the plurality of representations comprising a representation pack, and the receiving node may receive at step 410 a plurality of RTP data packets, wherein each RTP data packet comprises a generated representation. Each RTP packet may comprise one or more representations. As illustrated at 412, the receiving node may receive the RTP packet, generated by the sending node, over an Internet Protocol Multimedia Subsystem (IMS) infrastructure.

As discussed above with respect to the method 300 performed by a sending node, a payload format of the RTP data packet may comprise the T.140 format for real time text, or may comprise a payload format specific to the data model. Thus, for examples in which the data format is SenML, the payload format may be specific to SenML, and may for example be named with reference to the SenML data format, such that the payload format name includes or comprises the name of the data model SenML. In examples in which the payload format comprises T.140, at least part of the representation contained in the data packet may be encoded as a plurality of T.140 code elements.

Referring still to FIG. 4a, at step 420, the receiving node extracts the representation of the resource from the RTP packet. As illustrated at 421, this may comprise reading at least a part of the representation of the resource from a payload of the RTP data packet. Parts of the representation may have been mapped to header fields of the RTP data packet, and so reading at least a part of the representation of the resource from a payload of the RTP data packet may comprise reading the representation minus such parts, which may include a name field, base name field or time field of a SenML record.

As illustrated at 422, extracting the representation of the resource may also or alternatively comprise mapping information from at least one header field of the RTP data packet to a field in the representation. In examples in which the representation is one of a plurality of representations of the resource according to the data model, the plurality of representations comprising a representation pack, and the receiving node receives a plurality of RTP data packets with each RTP data packet comprising a generated representation, the receiving node may identify a received RTP data packet in which a marker bit of the RTP header is set, and determine that the identified received RTP packet comprises at least one of the first or last representation of the representation pack, as shown at 423.

FIG. 4b illustrates in greater detail how the mapping in step 422 between header fields of the received RTP packet(s) and fields of the resource representation to be extracted from the packet may be carried out. Referring to FIG. 4b, in one example, information from a timestamp field of the RTP data packet may be mapped to a time field of the representation in step 422a, and/or information from a Synchronisation Source (SSRC) field of the RTP data packet may be mapped to a name field of the representation in step 322b.

Considering first the time field of the representation, in step 422ai, the receiving node may set a value of the time field of the representation to be the value of the timestamp field of the RTP data packet. The value of the time field may thus be omitted when reading at least a part of the generated representation of the resource from a payload of the RTP data packet. In examples in which the representation is one of a plurality of representations of the resource according to the data model, the plurality of representations comprising a representation pack, the receiving node may set a value of the time field of a first representation of the representation pack to be the value of the timestamp field of the RTP data packet as illustrated at 422aii. The time field for other representations in the representation pack may indicate a time difference from the value of the timestamp field of the RTP data packet.

Considering now the name field of the representation, the receiving node may set a value of the name field of the representation to be a value that corresponds in a mapping to the value of the SSRC field of the received RTP data packet, as shown at 422bi. The mapping may be the mapping that was negotiated in step 402. The value of the SSRC field may be a numeric or alphanumeric value, and may for example be shorter than the entry in the name field of the representation, to which it is mapped. An example mapping is discussed in greater detail below with reference to example implementations of the methods disclosed herein.

FIGS. 3a, 3b, 4a and 4b illustrated in greater detail how a sending node may in effect stream sensor measurement data to a receiving node, using RTP packets to contain the sensor measurement data. This action may be supported by an intermediate node, in methods illustrated in FIGS. 5 and 6.

Figure 5:
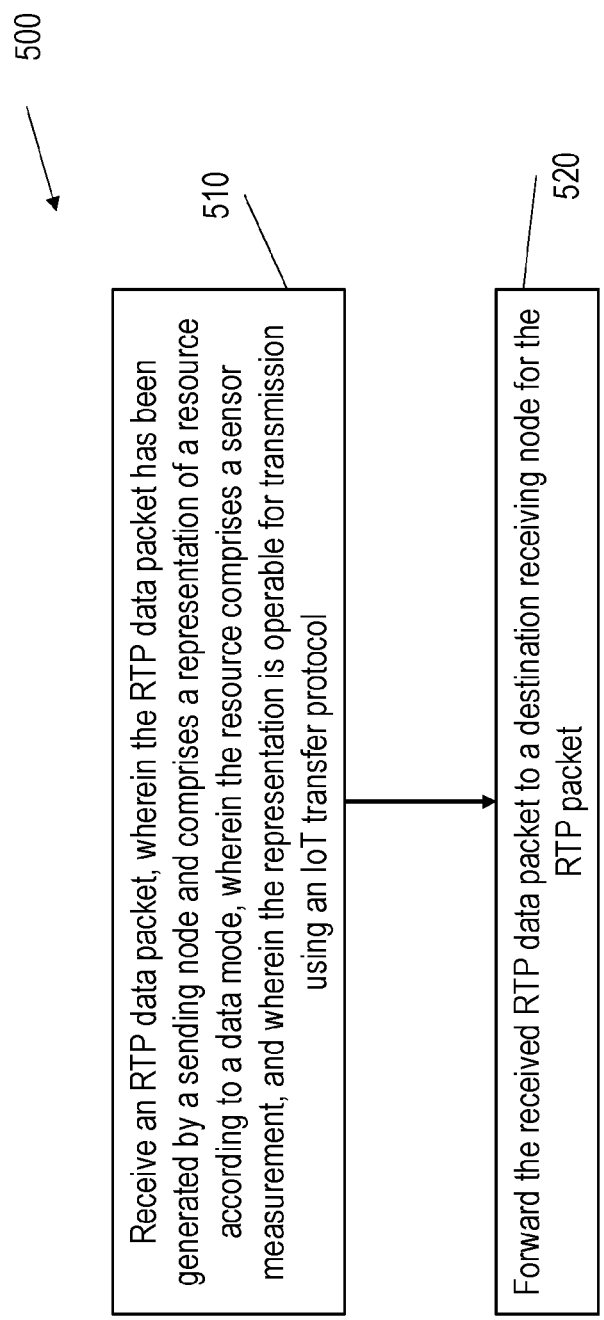
FIG. 5 is a flow chart illustrating process steps in a method performed by an intermediate node.

FIG. 5 is a flow chart illustrating process steps in a method 500 performed by an intermediate node, which may be a physical node or a virtual node running in a cloud, edge cloud or fog deployment. The intermediate node may for example comprise an RTP mixer node or an RTP translator node and may be a part of an IMS. Referring to FIG. 5, the method 500 comprises, in a first step 510, receiving an RTP data packet, wherein the RTP data packet has been generated by a sending node and comprises a representation of a resource according to a data model. The resource comprises a sensor measurement, and the representation is operable for transmission using an IoT transfer protocol such as CoAP, MQTT or HTTP. The method then comprises, in step 520, forwarding the received RTP data packet to a destination receiving node for the RTP packet.

Figure 6:
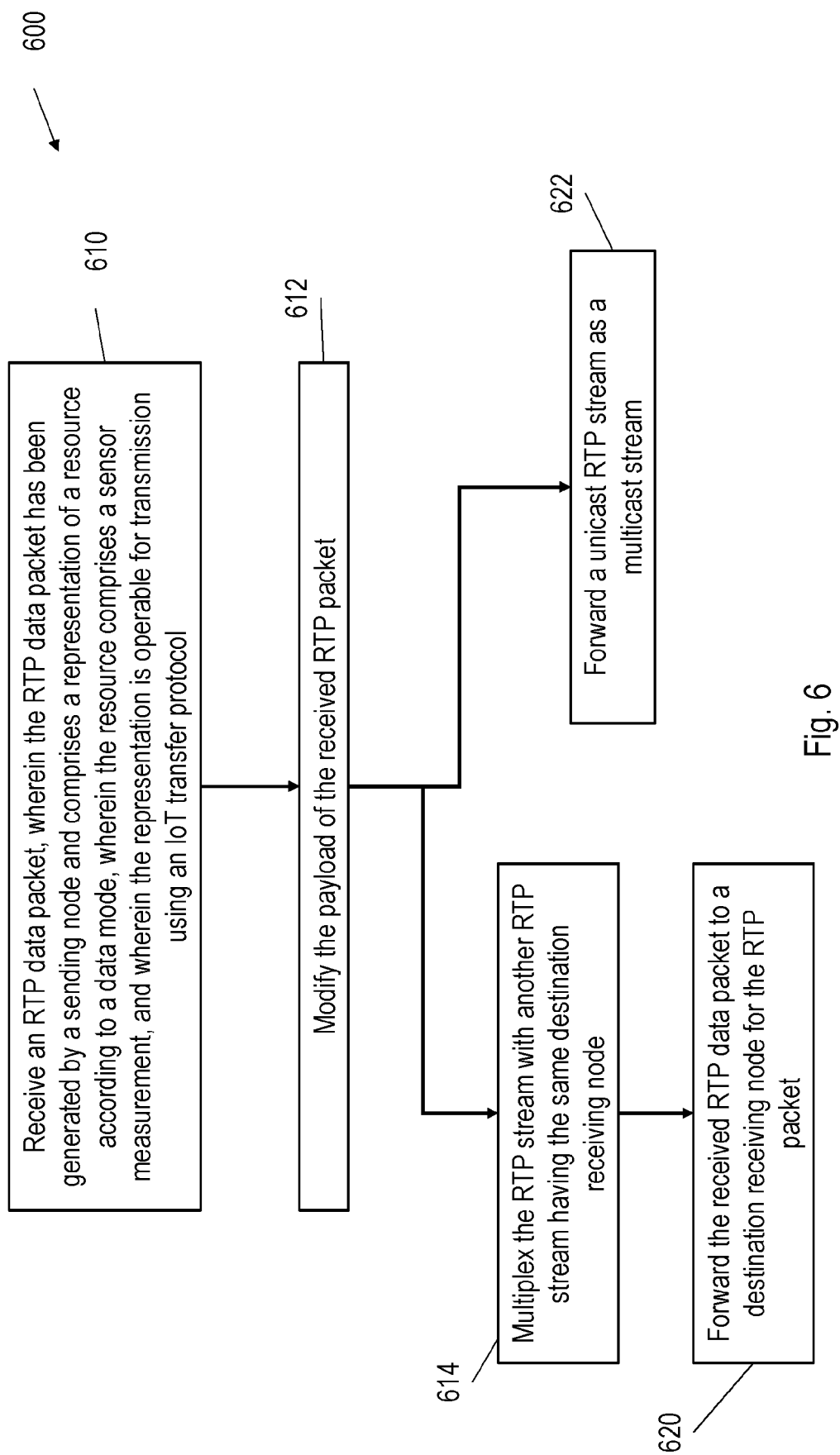
FIG. 6 is a flow chart illustrating process steps in another example of the method performed by an intermediate node.

FIG. 6 illustrates process steps in a further example of method 600 performed by an intermediate node, which may be a physical node or a virtual node running in a cloud, edge cloud or fog deployment. The intermediate node may for example comprise an RTP mixer node or an RTP translator node and may be part of an IMS. The steps of the method 600 illustrate one example way in which the steps of the method 500 may be implemented and supplemented in order to achieve the above discussed and additional functionality.

Referring to FIG. 6, in a first step 610, the intermediate node receives an RTP data packet, wherein the RTP data packet has been generated by a sending node and comprises a representation of a resource according to a data model. The resource comprises a sensor measurement, and the representation is operable for transmission using an IoT transfer protocol such as CoAP, MQTT or HTTP. In step 612, the intermediate node may modify the payload of the received RTP packet. This modification may take different forms, including for example moving timestamps from an RTP packet header to a payload of the RTP packet including the resource representation, moving timestamps from a representation included in an RTP payload to the RTP packet header, etc.

The intermediate node may then, in step 614, multiplex the RTP stream with another RTP stream having the same destination receiving node, and forward the received RTP data packet to a destination receiving node for the RTP packet in step 620. If the RTP packet is part of an RTP stream that is a unicast stream, the intermediate node may, in step 622, forward the RTP stream as a multicast stream.

As discussed above, the methods 100, 300, 200, 400, 500 and 600 are performed by a sending node, a receiving node, and an intermediate node respectively. The present disclosure provides a sending node, a receiving node and an intermediate node which are adapted to perform any or all of the steps of the above discussed methods. The intermediate node may comprise a part of an IP Multimedia System.

Figure 7:
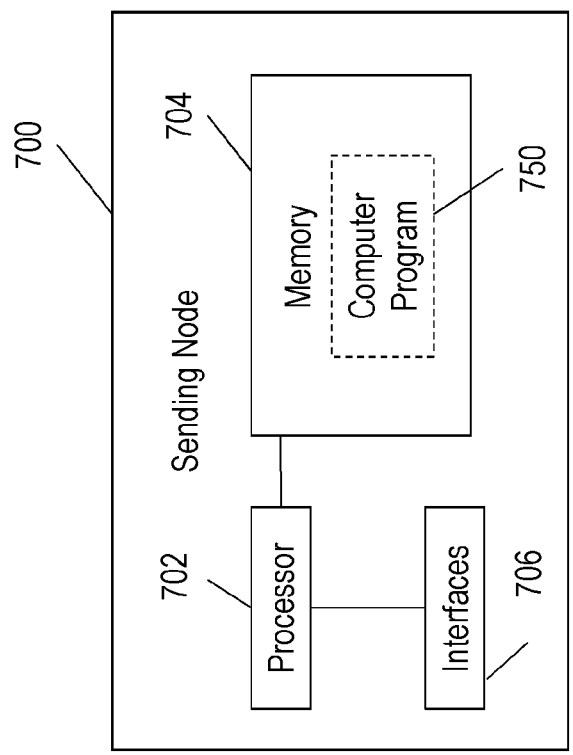
FIG. 7 is a block diagram illustrating functional modules in a sending node.

FIG. 7 is a block diagram illustrating a sending node 700 which may implement the method 100 and/or 300 according to examples of the present disclosure, for example on receipt of suitable instructions from a computer program 750. Referring to FIG. 7, the sending node 700 comprises a processor or processing circuitry 702, and may comprise a memory 704 and interfaces 706. The processing circuitry 702 is operable to perform some or all of the steps of the method 100 and/or 300 as discussed above with reference to FIGS. 1, 3a and 3b. The memory 704 may contain instructions executable by the processing circuitry 702 such that the sending node 700 is operable to perform some or all of the steps of the method 100 and/or 300. The instructions may also include instructions for executing one or more telecommunications and/or data communications protocols. The instructions may be stored in the form of the computer program 750.

Figure 8:
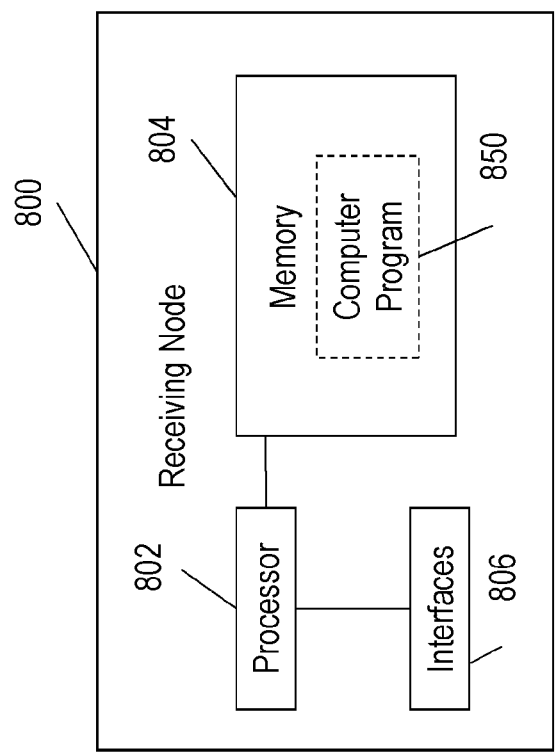
FIG. 8 is a block diagram illustrating functional modules in a receiving node.

FIG. 8 is a block diagram illustrating a receiving node 800 which may implement the method 200 and/or 400 according to examples of the present disclosure, for example on receipt of suitable instructions from a computer program 850. Referring to FIG. 8, the receiving node 800 comprises a processor or processing circuitry 802, and may comprise a memory 804 and interfaces 806. The processing circuitry 802 is operable to perform some or all of the steps of the method 200 and/or 400 as discussed above with reference to FIGS. 2, 4a and 4b. The memory 804 may contain instructions executable by the processing circuitry 802 such that the receiving node 800 is operable to perform some or all of the steps of the method 200 and/or 400. The instructions may also include instructions for executing one or more telecommunications and/or data communications protocols. The instructions may be stored in the form of the computer program 850.

Figure 9:
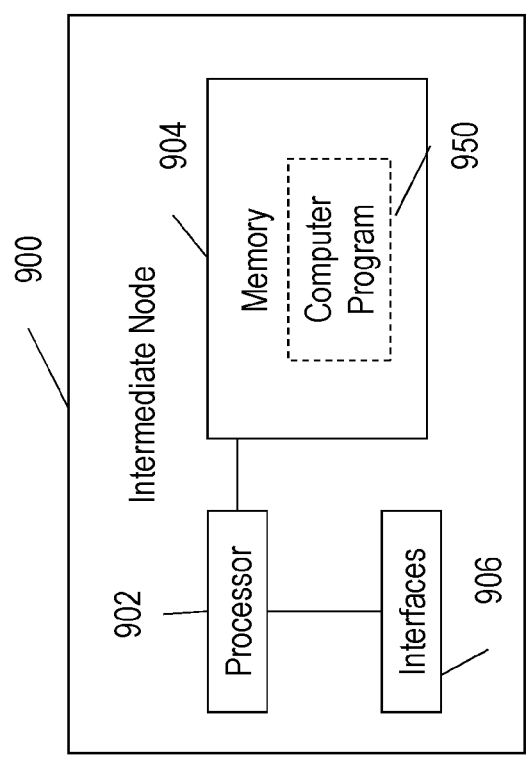
FIG. 9 is a block diagram illustrating functional modules in an intermediate node.

FIG. 9 is a block diagram illustrating an intermediate node 900 which may implement the method 500 and/or 600 according to examples of the present disclosure, for example on receipt of suitable instructions from a computer program 950. Referring to FIG. 9, the intermediate node 900 comprises a processor or processing circuitry 902, and may comprise a memory 904 and interfaces 906. The processing circuitry 902 is operable to perform some or all of the steps of the method 500 and/or 600 as discussed above with reference to FIGS. 5 and 6. The memory 904 may contain instructions executable by the processing circuitry 902 such that the intermediate node 900 is operable to perform some or all of the steps of the method 500 and/or 600. The instructions may also include instructions for executing one or more telecommunications and/or data communications protocols. The instructions may be stored in the form of the computer program 950.

In some examples, the processor or processing circuitry 702, 802, 902 described above may include one or more microprocessors or microcontrollers, as well as other digital hardware, which may include digital signal processors (DSPs), special-purpose digital logic, etc. The processor or processing circuitry 702, 802, 902 may be implemented by any type of integrated circuit, such as an Application Specific Integrated Circuit (ASIC), Field Programmable Gate Array (FPGA) etc. The memory 704, 804, 904 may include one or several types of memory suitable for the processor, such as read-only memory (ROM), random-access memory, cache memory, flash memory devices, optical storage devices, solid state disk, hard disk drive etc.

The following discussion provides example details of how the above methods and nodes may be implemented to facilitate transport of SenML data over RTP.

As discussed above, SenML is a data model to describe device measurements such as sensor values, and metadata associated with devices and their measurements. Such data is collected in a SenML Record. One or more SenML records are collected in an array, referred in this disclosure as a SenML Pack.

A SenML Pack can be serialized using different encodings, including for example JSON, CBOR and XML. An example of a SenML Pack, the Pack containing one SenML record and serialized using JSON, is illustrated below:

```
[
{"n":"urn:dev:ow:10e2073a01080063","u":"Cel","v":23.1,
  "t":1.276020076e+09}
]
```

Another example of a SenML Pack, the Pack containing two SenML records and also serialized using JSON, is illustrated below.

```
[
{"n":"urn:dev:ow:10e2073a01080063","u":"Cel","t":1.276020076e+09,
  "v":23.5},
{"n":"urn:dev:ow:10e2073a01080063","u":"Cel","t":1.276020091e+09,
  "v":23.6}
]
```

SenML does not contain a sequence number for providing ordering of SenML Packs; the protocol used to transport SenML Packs is expected to provide in-order delivery. In general, the order of SenML Records within a SenML Pack has no semantical meaning, beyond the use of base names, which are strings that are prepended to the Name field of elements in a particular SenML Record and any Records that follow it. SenML Records may however contain time information (for example indicating when a sensor reading has been recorded) that can be used by SenML data consuming applications to order received data based on time.

Payload Format

According to examples of the present disclosure, SenML Records may be transported using RTP. When RTP is used to transport data, all data is transported using a specific payload format, which defines metadata and encoding for the data. The present disclosure envisages two options for the payload format with which SenML, or other simple measurement data, may be transported using RTP. In a first alternative, an existing payload type, T.140, may be used. T.140 is defined in RFC 4103 for transport of real-time text (such as subtitles for example). In a second alternative, a new payload type, specific to transport of SenML or other simple measurement data, may be defined.

T.140 Payload Format

RFC 4103 defines a payload format for transport of ITU-T T.140 real-time text. The IANA registered mime type value associated with the payload format is "text/t140". It will be appreciated that some additional information may be transferred in order to indicate that the "text/t140" payload format is used for SenML transport (instead of real-time text). Such additional information may be provided in the signaling protocol used to negotiate the usage of the payload format.

The T.140 payload format comprises one element, referred to as a T140block. The T140block is a collection of T.140 characters referred to as code elements. Most T.140 code elements are single ISO 10646 characters, but some are multiple-character sequences. Each character is UTF-8 encoded into one or more octets. This payload type is suitable for the text-based encodings (JSON and XML) of SenML, but may not be suitable for the binary encodings of SenML (CBOR and EXI).

Some code elements represent protocol functions related to how T.140 text is to be presented to the receiver (for example, alerting, line separator, etc.). As SenML data is not intended to be presented to a human user, the functions associated with those codes are not needed for SenML transport.

FIG. 10 is an example (from RFC 4103) of a text/t140 RTP packet:

SenML Payload Format

The new payload type proposed in this disclosure, which is specific to SenML or to SenML or to sensor measurement data, is very similar to the T.140 payload format. Nevertheless, instead of T140blocks, SenML blocks are used instead. A SenMLblock only contains the SenML serialization. There are no control commands, in the SenMLblock, meaning that the characters allowed in the payload are only those used to serialize SenML.

SenML RTP Field Mapping

As discussed above, in order to transport SenML data over RTP, a SenML Pack may be split into separate SenML Records, and one or more Records may be put in each RTP packet.

The RTP timestamp field may be set to the value of the time label of the first SenML Record that contains a time label. If the time label is not present in any of the SenML Records, the RTP timestamp field may be set using normal RTP procedures. There are two alternatives for handling time fields in SenML records:

SenML Records can indicate the time offset to the RTP timestamp using the SenML "t" field and omit the "t" field if the time difference is zero (this will be the case at least for the SenML Records which time label is used to set the RTP timestamp field, described above).

SenML Records can keep the original time stamps.

The first alternative described above provides better use of bandwidth as only a (commonly small) delta to the RTP time is indicated. However, keeping the original time stamps simplifies repackaging of SenML records, for example in an RTP mixer as discussed in further detail below.

If a SenML Pack contains multiple SenML Records, and those SenML Records are sent using multiple RTP packets, the RTP Marker "M" bit may be used to indicate that a SenML Record in an RTP packet represents the last SenML Record from a given SenML Pack. As described below, the RTP Synchronization Source (SSRC) field can be used by a receiver to identify which SenML Records were part of a given SenML Pack.

The RTP Synchronization Source (SSRC) field can be used as indication for SenML names, or Packs. Three uses of this field are discussed below.

The SSRC field may be used to indicate the SenML Name of the sender when the same SenML source is used in each RTP Record of a SenML Pack. The SSRC to name-string mapping may be delivered out of band (for example using RTCP or another signaling protocol). This enables use of RTP infrastructure methods for efficiently routing streams based on SSRC to route SenML Records based on SenML Name. When this method is used the SenML Name and Base name fields can be omitted from the SenML Records.

The SSRC field may be used to indicate the SenML Base name when all SenML Records in the RTP packet share the same Base name. The SSRC to base name-string mapping may be delivered out of band (for example using RTCP or another signaling protocol). If the SSRC field is used in this way, the base name fields can be omitted from the SenML Records.

In both of the above methods, an implementation may choose to keep the name fields intact (even if they provide redundant information) to make it easier to re-package the Packs in a mixer.

The SSRC field may also be used to keep track of RTP Records extracted from multiple overlapping SenML Packs that are sent at the same time.

The following Example 1 illustrates how SenMLdata may be packaged into RTP packets according to examples of the present disclosure.

Example 1: An example SenML Pack contains two SenML Records:

```
[
  {"n":"urn:dev:ow:10e2073a01080063","u":"Cel","t":1.276020076e+09,
   "v":23.5},
  {"n":"urn:dev:ow:10e2073a01080063","u":"Cel","t":1.276020091e+09,
   "v":23.6}
]
```

The SenML Pack is divided into its constituent SenML Records:

SenML Record #1:
{"n":"urn:dev:ow:10e2073a01080063","u":"Cel","t": 1.276020076e+09, "v":23.5}

SenML Record #2:
{"n":"urn:dev:ow:10e2073a01080063","u":"Cel","t": 1.276020091e+09, "v":23.6}

The RTP header of the RTP packet that contains SenML Record #1 is generated as illustrated in FIG. 11. The SenML time label is used to set the RTP timestamp field. The SenML Time label is removed from the SenML Record. The RTP SSRC field is set to 4545454. It is envisaged that the SenML endpoints have negotiated this value out-of-band, and have created a mapping between the value and the SenML Name label (urn:dev:ow:10e2073a01080063). The SenML Name label is removed from the SenML Record. The remaining fields of the SenML Record are included as the RTP payload.

The above Example 1 illustrates the RTP payload with SenML JSON encoding, but this is merely for the purpose of illustration. Other encodings may be used, and in practice the more compact binary SenML CBOR encoding may be preferred.

RTP SenML Mixer and Translator

The intermediate node of the present disclosure may have the functionality of an RTP SenML Mixer, an RTP SenML Translator, or both.

RTP Translators handle RTP streams at the RTP level (for example by multiplexing multiple RTP streams to be sent using the same IP address and port, or by forwarding a unicast SenML RTP stream as a multicast stream). RTP Translators do not modify the payload of the RTP packets (i.e., the SenML packs according to the present disclosure).

RTP Mixers can access and modify the payload of RTP packets. For example, according to the resent disclosure, an intermediate node having RTP Mixer functionality may collect SenML Records from multiple incoming RTP streams, use those SenML Records to create a new SenML Pack, and then send the SenML Records associated with that new SenML Pack in one or more outgoing RTP streams.
Redundancy When used over UDP, RTP is an unreliable transport protocol, which means it does not guarantee that a transmitted RTP packet will reach the receiver to which the packet is addressed. The RTP sequence number can be used by the receiver to detect packet loss and packets received out-of-order.

RFC 2198 describes an RTP payload for redundant audio data. A disadvantage of the mechanism defined in RFC 2198 is that the redundant encoding will always be sent, even if there is no packet loss. This behavior can have negative consequences for constrained networks. In addition, the RFC 2198 mechanism does not work well for protocols that do not send frequent data, as the mapping of redundant to primary data is done using timestamp offsets. Finally, the mechanism does not work in cases where RTP packets might get fragmented. In the case of SenML, fragmentation is likely owing to the expected RTP packet size.

RFC 4588 defines a mechanism according to which a receiver, once it detects a packet loss, can request the sender to re-transmit the packet. The receiver asks the sender to re-transmit a packet associated with the sequence number of the lost packet, using the RTCP NACK command, as defined in RFC 4585.

By default, RFC 4103, which defines the payload format for transport of ITU-T T.140 real-time text, uses the RFC 2198 mechanism for redundancy. However, use of other mechanisms is permitted. Consequently, while any redundancy mechanism may be employed in connection with the methods and apparatus of the present disclosure, it is envisaged that the mechanism described in RFC 4588 may be better suited to the transport of SenML data.
IP Multimedia Subsystem (IMS)

The IMS is an example of a multimedia infrastructure that uses RTP to transfer real-time traffic such as audio and video. The present disclosure envisages the use of an IMS infrastructure to distribute SenML data. The IMS includes a node called a Media Resource Function (MRF), which can act as a conferencing server. According to examples of the present disclosure, the MRF may receive SenML data from many sources and distribute it to many recipients.

Aspects of the present disclosure propose a sending node, receiving node, intermediate node and associated methods, which enable the transport of SenML or other simple sensor data using RTP. Examples of the present disclosure enable the use of the same SenML data serialization for RTP, CoAP, and other transport protocols. Consequently, the translation between the transport protocols is straightforward in environments in which both transport protocols are used.

Examples of the present disclosure may be implemented using existing real-time multimedia infrastructure to transport SenML data. In this manner, most functions available to multimedia traffic may also be applied to SenML traffic. Such functions may include NAT traversal mechanisms, conferencing capabilities for sharing SenML data with multiple users, security mechanisms, including the Secure Real-time Transport Protocol (SRTP) and transport reliability and redundancy solutions such as FEC (Forward Error Correction). In addition, examples of the present disclosure achieve a lower transport overhead than when SenML data is transported using RESTful protocols.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A sending node, the sending node comprising processing circuitry configured to perform a method comprising:
    obtaining a first representation of a first sensor measurement generated at a point in time, wherein the first representation of the first sensor measurement was generated according to a data model, and the first representation of the first sensor measurement comprises:
        a first sensor value for the first sensor measurement, and
        a first time value that represents the point in time at which the first sensor measurement was generated;
    after obtaining the first representation of the first sensor measurement, generating a first Real-time Transport Protocol (RTP) data packet using the first sensor value for the first sensor measurement and the first time value for the first sensor measurement, wherein
    the RTP data packet comprises a header and a payload, the header comprising a timestamp field, and
    generating the first RTP data packet comprises:
        obtaining the first sensor value from the first representation of the first sensor measurement;
        including the obtained first sensor value in the payload of the first RTP packet;
        obtaining the first time value from the first representation of the first sensor measurement; and
        including the first time value that represents the point in time at which the first sensor measurement was generated, or a first derived time value derived using the first time value that represents the point in time at which the first sensor measurement was generated, in the timestamp field of the header of the first RTP data packet; and
    sending the generated first RTP packet to a receiving node.

2. The sending node of claim 1, wherein
    the data model comprises Sensor Measurement Links (SenML),
    the first representation of the first sensor measurement is a first SenML Record, the first representation of the first sensor measurement further comprises first unit information associated with the first sensor value, the first unit information indicating a unit of measurement for the first sensor value, and generating the RTP packet further comprise obtaining the first unit information from the first representation and including the obtained first unit information in the RTP packet.

3. The sending node of claim 1, wherein
including the first sensor value in the first RTP packet comprises including the first sensor value in a payload of the first RTP packet.

4. The sending node of claim 3, wherein
the method further comprises obtaining a second representation of a second sensor measurement, wherein the second representation of the second sensor measurement was generated according to the data model, and the second representation of the second sensor measurement comprises: a second sensor value for the second sensor measurement and a second time value, and
generating the first RTP data packet further comprises including in the payload of the first RTP packet the second sensor value and a third time value.

5. The sending node of claim 4, wherein the third time value is equal to the difference between the first time value and the second time value.

6. The sending node of claim 1, wherein
the method further comprises obtaining a second representation of a second sensor measurement, wherein the second representation of the second sensor measurement was generated according to the data model, and the second representation of the second sensor measurement comprises: a second sensor value for the second sensor measurement and a second time value,
after obtaining the second representation of the second sensor measurement, generating a second RTP data packet using the second sensor value for the second sensor measurement and the second time value for the second sensor measurement, wherein generating the second RTP data packet comprises:
obtaining the second sensor value from the second representation of the second sensor measurement;
including the obtained second sensor value in the RTP packet;
obtaining the second time value from the second representation of the second sensor measurement;
including the obtained second time value, or a second derived time value derived using the obtained second time value, in a timestamp field of the RTP data packet; and
including in the second RTP packet an indicator indicating that the second sensor measurement is the last of a pack of sensor measurements; and
sending the second RTP packet to the receiving node.

7. The sending node of claim 1, wherein
the first representation of the first sensor measurement comprises a name label, and
generating the first RTP data packet further comprises including the name label in a Synchronisation Source (SSRC) field of the first RTP data packet or including in the SSRC field a label obtained using the name label included in the first representation of the first sensor measurement.

8. The sending node of claim 1, wherein a payload format of the RTP data packet comprises T.140.

9. The sending node of claim 1, wherein a payload format of the RTP data packet comprises a payload format specific to the data model.

10. A receiving node comprising processing circuitry configured to:
receive a Real-time Transport Protocol (RTP) data packet, wherein the RTP data packet comprises a header and a payload, the header comprising a timestamp field containing a time value and the payload containing a sensor value for a sensor measurement generated at a point in time;
extract the time value from the timestamp field of the header of the RTP data packet;
extract the sensor value from the payload of the RTP packet; and
use the extracted time value and sensor value to generate, according to a data model, a representation of the sensor measurement, wherein
the receiving node is configured to generate the representation of the sensor measurement by:
including in the representation i) the extracted time value, wherein the extracted time value represents the point in time at which the sensor measurement was generated or ii) a time value derived using the extracted time value, wherein the derived time value represents the point in time at which the sensor measurement was generated; and
including in the representation the extracted sensor value.

11. The receiving node of claim 10, wherein the data model comprises Sensor Measurement Links (SenML), and wherein the representation of the resource according to the data model comprises a SenML Record.

12. The receiving node of claim 10, wherein the processing circuitry is further configured to extract the representation of the resource from the RTP packet by:
reading at least a part of the representation of the resource from a payload of the RTP data packet.

13. The receiving node of claim 10, wherein the representation is one of a plurality of representations of the resource according to the data model, the plurality of representations comprising a representation pack, and wherein the processing circuitry is further configured to map information from a timestamp field of the RTP data packet to a time field of the representation by:
setting a value of the time field of a first representation of the representation pack to be the value of the timestamp field of the RTP data packet.

14. The receiving node of claim 10, wherein the representation is one of a plurality of representations of the resource according to the data model, the plurality of representations comprising a representation pack, and wherein the processing circuitry is further configured to receive a plurality of RTP data packets, wherein each RTP data packet comprises a generated representation; and
wherein the processing circuitry is further configured to identify a received RTP data packet in which a marker bit of the RTP header is set, and determine that the identified received RTP packet comprises at least one of the first or last representations of the representation pack.

15. The receiving node of claim 10, wherein the processing circuitry is further configured to map information from at least one header field of the RTP data packet to a field in the representation by:

mapping information from a Synchronisation Source (SSRC) field of the RTP data packet to a name field of the representation.

16. The receiving node of claim 10, wherein a payload format of the RTP data packet comprises T.140.

17. A method, the method comprising:
obtaining a first representation of a first sensor measurement generated at a point in time, wherein the first representation of the first sensor measurement was generated according to a data model, and the first representation of the first sensor measurement comprises:
  a first sensor value for the first sensor measurement, and
  a first time value that represents the point in time at which the first sensor measurement was generated;
after obtaining the first representation of the first sensor measurement, generating a first Real-time Transport Protocol (RTP) data packet using the first sensor value for the first sensor measurement and the first time value for the first sensor measurement, wherein
the RTP data packet comprises a header and a payload, the header comprising a timestamp field, and
generating the first RTP data packet comprises:
  obtaining the first sensor value from the first representation of the first sensor measurement;
  including the obtained first sensor value in the payload of the first RTP packet;
  obtaining the first time value from the first representation of the first sensor measurement; and
  including the obtained first time value, or a first derived time value derived using the obtained first time value, in the timestamp field of the header of the first RTP data packet; and
sending the generated first RTP packet to a receiving node.

18. A method performed by a receiving node, the method comprising:
receiving a Real-time Transport Protocol (RTP) data packet, wherein the RTP data packet comprises a header and a payload, the header comprising a timestamp field containing a time value and the payload containing a sensor value for a sensor measurement generated at a point in time; and
extracting the time value from the timestamp field of the header of the RTP data packet;
extracting the sensor value from the payload of the RTP data packet; and
generating, according to a data model, a representation of the sensor measurement, wherein
generating the representation comprises including in the representation the extracted sensor value, and
generating the representation further comprises including in the representation i) the extracted time value, wherein the extracted time value represents the point in time at which the sensor measurement was generated, or ii) a time value derived using the extracted time value, wherein the derived time value represents the point in time at which the sensor measurement was generated.

* * * * *